United States Patent [19]
Ter-Minassian

[11] Patent Number: 6,120,368
[45] Date of Patent: Sep. 19, 2000

[54] FORCE LIMITED APPARATUS FOR TENDERIZING MEAT

[76] Inventor: Viguen Ter-Minassian, 6661 Avignon Blvd., Falls Church, Va. 22043

[21] Appl. No.: 09/183,741

[22] Filed: Oct. 30, 1998

[51] Int. Cl.[7] .................................................. A22C 9/00
[52] U.S. Cl. ............................................................ 452/141
[58] Field of Search .................................. 452/141, 144, 452/146

[56] References Cited

U.S. PATENT DOCUMENTS

| | | | |
|---|---|---|---|
| 863,717 | 8/1907 | Jamison | 452/141 |
| 3,772,737 | 11/1973 | Fleiss | 452/146 |
| 4,086,683 | 5/1978 | Davis et al. | 452/141 |
| 4,169,300 | 10/1979 | McCullough | 452/141 |

*Primary Examiner*—Willis Little

[57] ABSTRACT

An apparatus for tenderizing meat comprising a reciprocable head for releasably holding knife blades for force-limited insertion into meat to be tenderized, the reciprocable head comprising a guide plate, a friction plate and an orientation plate, the guide plate having a plurality of guide apertures formed therein, the friction plate having a plurality of friction apertures formed therein, and the orientation plate having a plurality of orienting apertures formed therein, and said plates being assembled in spaced, parallel relationship with the apertures in each plate being in alignment, a plurality of elongated knife blades having cutting edges formed on one end thereof and positioned in the aligned apertures such that each blade passes through an aperture in each of the plates, the cutting blades each having a friction member formed therein and releasably retained in an aperture in the friction plate by a pre-determined non-magnetic frictional force for holding the blades independently in a fixed position as the blades are inserted into the meat to be tenderized.

16 Claims, 4 Drawing Sheets

FORCE LIMITED APPARATUS FOR TENDERIZING MEAT

This invention relates to a force-limited apparatus for tenderizing meat. More particularly, the invention relates to a non-magnetic force-limited apparatus for tenderizing meat which is an improvement over known apparatus in this field.

BACKGROUND AND OBJECTS OF THE INVENTION

In the field of meat tenderizing apparatus, one well known machine is of the type shown in U.S. Pat. No. 4,437,207 dated Mar. 20, 1984 and U.S. Pat. No. 3,535,734 dated Oct. 27, 1970, both of which issued to Ross. This type of apparatus comprises a plurality of vertical penetrating elements which are held in a head, and caused to penetrate a piece of meat which passes beneath the head. The penetrating elements have knife-edges on the ends thereof and cut the meat fibers as they enter the meat. By arranging the penetrating elements in a particular array, a plurality of small, orthogonal cuts are made in the meat fibers, which tenderizes the meat.

One problem with this type of apparatus becomes apparent when the knife encounters a piece of bone in the meat. When this happens, damage to the machine and the penetrating elements could arise if there were no means for limiting the degree of penetrating force exerted. Thus, the earlier Ross patent provided a way for limiting the penetration force exerted on the meat utilizing a fluid pressure head for holding the penetrating elements. This limited the force to about 3 to 4 pounds of force under operating conditions, before releasing the hold on the penetrating element when it contacted a piece of bone. When a piece of bone was contacted, the contacting element(s) was (were) released so that as the head came down toward the meat, that element or elements was released from the head when the force exceeded the threshold. However with this type of machine, the seals used with the fluid system tend to increase the frictional forces and thus the inserting force.

The later Ross patent provided a different arrangement for limiting the force, in particular a head block with a plurality of magnets mounted therein. Essentially there was one magnet for each penetrating element, and each penetrating element included a portion which served as a pole piece for the associated magnet. The magnets are special magnets made from a cobalt-samarium magnet material, and cooperate with pole pieces made of a special silicon iron alloy. Initially the special magnetic material coupled with the special pole pieces allowed for a rather precise force range to be applied for holding the penetrating elements or knife blades in position in the mounting head, typically on the order of 6–7 pounds of force. However, the head itself is rather bulky, and the design is such that cleaning is somewhat difficult. Small pieces of food are trapped along the shaft of the blade inside the head and trap dirt which tends to build up in the head or on the knife blade. In addition, the pole pieces tend to wear out and/or corrode, so that the limiting force diminishes significantly. Initially the force is about 6 to 7 pounds, but over time diminishes to about 2 pounds or less, rendering the blade functionally useless. Thus the blades are considered expendable parts.

The present invention seeks to provide an improvement in the field of meat tenderizing apparatus, and particularly in the force limiting structure and the associated mounting head for the tenderizing elements.

Accordingly, a primary object of this invention is to overcome the disadvantages of the prior art meat tenderizing apparatus.

Another object of the present invention is to provide an improved force limiting apparatus for a meat tenderizing machine.

Still another object of the invention is to provide an improved head which incorporates an improved force limiting means.

Yet another object of the invention is to provide an improved head for a meat tenderizing machine which can be easily cleaned.

Still a further object of the present invention is to provide an improved head for a meat tenderizing machine with reduced cost and improved simplicity and performance.

Yet a further object of the invention is to provide an improved force limiting apparatus for a meat tenderizing machine which is non-magnetic, non-fluid controlled.

Still another object of the invention is to provide an improved force limiting apparatus for a meat tenderizing machine which is mechanical in nature.

DESCRIPTION OF THE INVENTION

The improved force limiting apparatus according to the present invention comprises an improved blade holding head and improved blades for use with the head. The force limiting means is non-magnetic and non-fluid, meaning that it does not use magnetic force to retain the blades in position, and does not use fluid means. Rather, the force limiting means according to the present invention is mechanical in nature and utilizes cooperating friction elements built into the head of the machine and the knife blades.

The apparatus which comprises the head of the tenderizing machine comprises three plates. At the upper end of the knife blade, the blade passes through a guide plate which holds the blades at the proper height or axial position for normal use. The blades next pass through a friction plate, and finally through an orientation plate. The three plates are secured together in spaced relationship so as to provide an open configuration for the head.

In one embodiment, the knife blades have a split or bifurcated portion of the stem of the knife blade near the head of the blade. The furcations serve to form a spring-like portion integral with the blade. This spring-like portion fits into an opening in the friction plate. The dimensions of the split portion of the blade and the opening in the friction plate serve to define the friction producing mechanism which holds the blades in position in the head. When the vertical force exerted upon the blade as the head descends toward the meat exceeds a predetermined threshold value, which exceeds the frictional force holding the split portion of the blade in the friction plate, the blade slides in the friction plate as the plate descends, until the split portion exits the friction plate and then travels freely without frictional restraint. Other configurations are shown for the friction portion of the blade.

BRIEF DESCRIPTION OF THE DRAWINGS

The foregoing and other objects and advantages of the present invention will become apparent from a detailed consideration of the accompanying description and claims when taken together with the accompanying drawings, which show the present invention by way of a non-limiting example of a preferred embodiment, and in which:

DETAILED DESCRIPTION OF PREFERRED EMBODIMENTS

Figure 1:
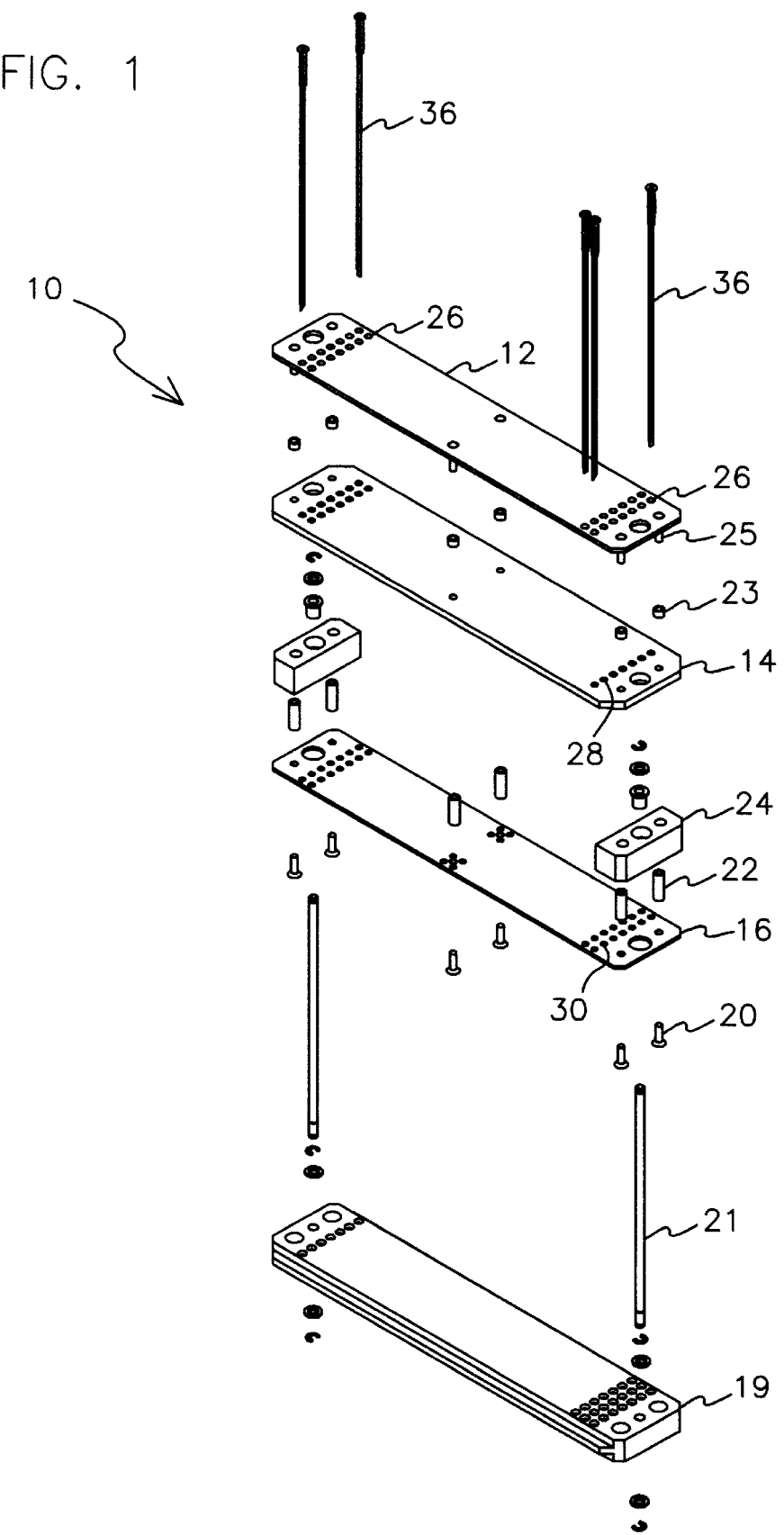
FIG. 1 is an exploded view of an improved head according to the present invention.

The apparatus of the present invention in particularly suited to replace the magnetic force-limited apparatus of U.S. Pat. No. 4,437,207 which is used in the machine disclosed in U.S. Pat. No. 3,535,734, and these patents are incorporated herein by reference for greater description of their details. As shown in FIG. 1 of the present invention, the improved head is generally designated 10, and is seen to include a first plate 12 termed a guide plate, a second plate 14 termed a friction plate, and a third plate 16 termed an orientation plate. An additional plate is termed a hold-down plate 19, and is spaced from the other plates. The assembly of plates 12, 14 and 16 is able to move vertically relative to the hold-down plate 19. The hold-down plate simply holds the meat in place as the knife blades are inserted into and withdrawn from the piece of meat, and prevents the lower, distal ends of the knife blades from becoming misaligned when they are withdrawn from the meat and the head is fully raised. The upper friction head and the lower hold-down plate are positioned vertically relative to each other by the tenderizer drive mechanism, not shown.

The three plates 12, 14 and 16 are assembled together by means of screws 20 which pass through spacers 22, 23 and spacer blocks 24 and threadedly engage the threaded bosses 25 attached to the guide plate 12. Other arrangements may be used for the assembly of the three plates, but this arrangement has been found to be inexpensive and easy to assemble.

The guide plate 12 is provided with a plurality of apertures 26 which are typically drilled in the plate. The apertures are arranged in a grid arrangement over a major portion of the surface of the plate 12.

The friction plate 14 is also provided with a plurality of apertures 28 which will be described in greater detail below, but which are arranged in the plate 14 so as to be in vertical alignment with the apertures 26 in the guide plate 12 when the head is assembled.

The orientation plate 16 is provided with a plurality of apertures 30 which are also described in greater detail below, and are arranged in the plate 16 so as to be in vertical alignment with the apertures 26 and 28 in the plates 12 and 14 when the head is assembled.

Figure 4:
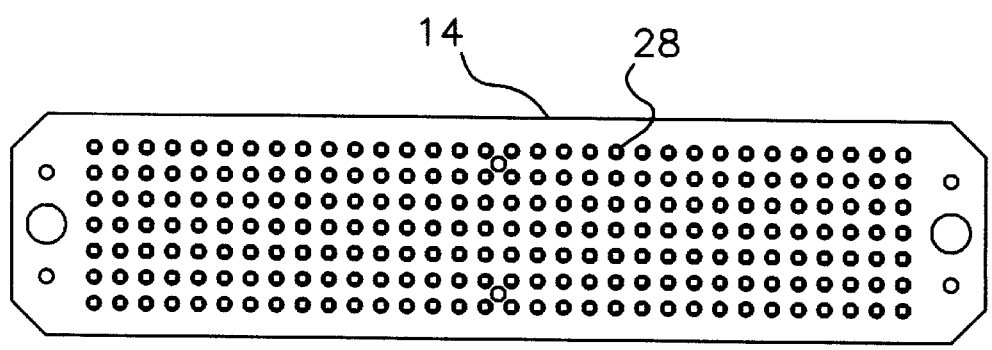
FIG. 4 is a top plan view of the friction block.
Figure 5:
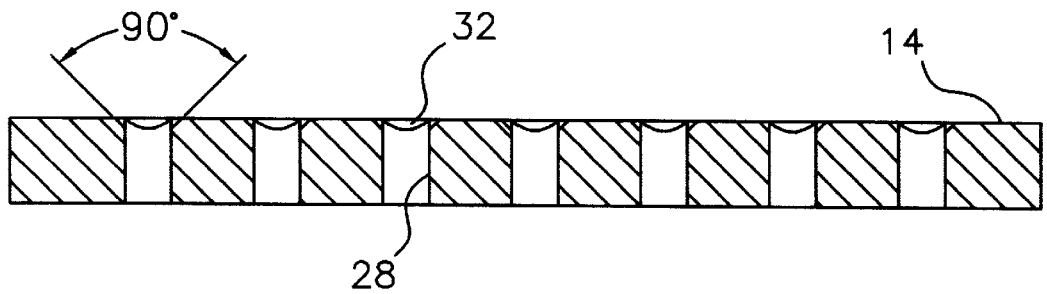
FIG. 5 is an enlarged cross-sectional view along transversely through the center of the apertures in the friction block of FIG. 4.
Figure 6:
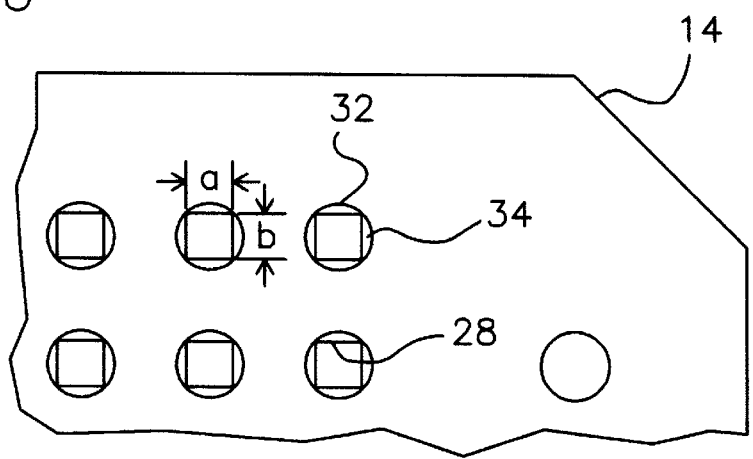
FIG. 6 is an enlarged fragmentary view of the friction block of FIG. 4.

With reference to FIGS. 4, 5 and 6, the friction plate 14 is shown with the apertures 28 formed therein. The apertures 28 are preferably square or rectangular in their configuration, and would ordinarily be produced by machining the apertures into the plate 14. The sides of the apertures have lengths a, b which are preferably equal. On the upper surface of the plate 14, a chamfer 32 is formed at the top of each aperture, the chamfer typically being at 90° chamfer as shown in FIG. 5. This chamfer 32 provides a tapered guide surface 34 surrounding each of the apertures 28.

Figure 7:
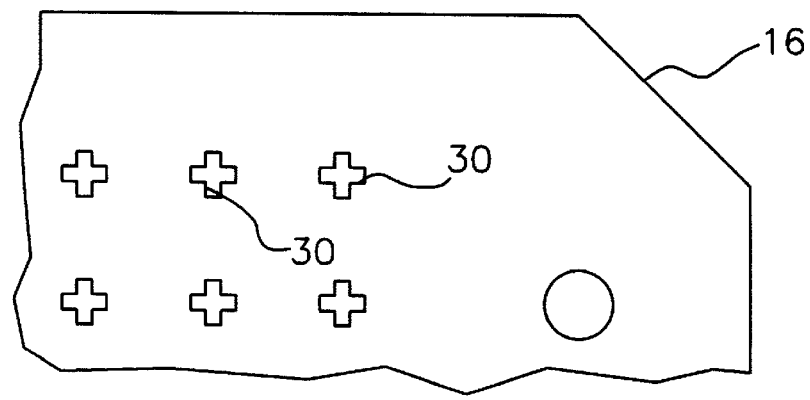
FIG. 7 is an enlarged fragmentary view of the orientation guide of the apparatus.

The apertures 30 in the orientation plate 16 are shown greatly enlarged in FIG. 7 and have a plus (+) sign or cruciform shape, with the orthogonal axes parallel to the edges of the plate 16. If desired, a chamfer may also be provided in the top surface of plate 16 surrounding each of the apertures 30, to facilitate insertion of the blades.

As shown in FIG. 1, blades 36 are inserted into each of the aligned apertures 26, 28 and 30. The blades generally have a thin, rectangular cross-section, and are oriented by means of the orientation plate, so that the major axis of the rectangular cross-section of each blade will be parallel to either the long side of the plates 12, 14, 16 or to the short sides of the plates. According to the desired positioning of the blades, the cuts in the meat may be made in two orthogonal directions, for improving the tenderizing of the meat. Thus the orientation plate enables the provision of the mutually orthogonal cuts, without random cuts being made in other directions. This, in turn, improves the appearance of the tenderized meat.

Figure 2:
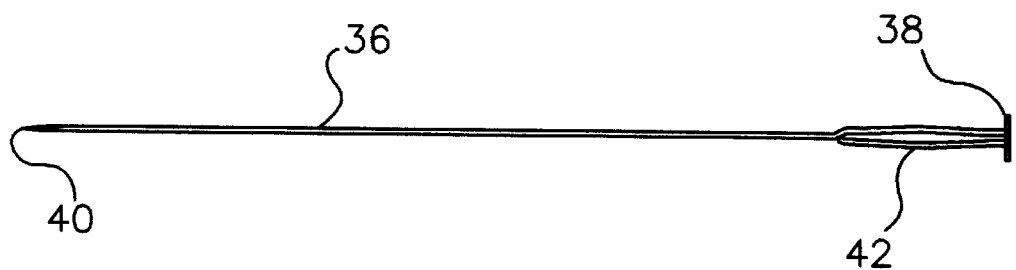
FIG. 2 is an enlarged plan view of one knife blade according to the present invention.
Figure 3:
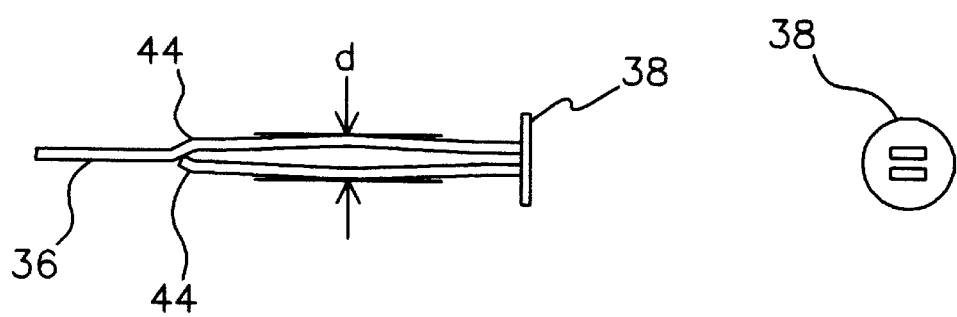
FIG. 3 is an enlarged view of the force limiting head portion of the knife blade of FIG. 2.

The blades 36 are shown in detail in FIGS. 2 and 3. These blades are elongated and typically about nine inches in length, and are thin but rectangular in cross-section. A head 38 is provided at one end of the blade, and a knife edge 40 is provided at the other end. A frictional member 42 is provided near the head end of the blade, and positioned along the length thereof so that when the knife blade 36 is fully inserted into the head assembly 10, the frictional member 42 is located within the apertures 28 of the friction plate 14.

In the embodiment shown in FIG. 3, the frictional member 42 is formed by a pair of furcations 44 which are secured to the head at one end and to the blade 36 at the other. Each of the furcations 44 has a slightly curved shape, with a relatively large radius of curvature, so that the furcations are spaced apart near their midsections, and a smooth transition to the blade. The furcations are heat treated so that they have a spring-like resiliency which urges the furcations apart by a dimension d which is slightly greater than the dimensions a and b of the apertures 28. Thus, when the blades are inserted into apertures, the furcations are caused to flex toward each other. The chamfers 32 facilitate the sliding of the frictional portions 42 into the apertures, and the knife blades 36 are held in place in the apertures by the force of these portions against the walls of the apertures. This holding force is therefore mechanical and non-magnetic. Moreover, the materials used for producing the knife blades, the frictional members 42, and the frictional plate 14 are much lower in cost and weight, and greatly reduce the entrapment of food particles and dirt in the head.

In addition, the spacers 22, 23 and the spacer blocks 24 keep the plates 12, 14 and 16 separated, such that cleaning of the head is greatly facilitated. Cleaning solution is able to penetrate the interior of the head assembly, and even between the furcations 44 of the frictional portion 42, greatly improving the ability to clean the head of the tenderizer machine.

While one embodiment of the frictional portion 42 has been shown in the drawings, clearly this frictional element may take other shapes while still accomplishing the goal of exerting a holding force against the sidewalls of the apertures 28 in the friction plate, for releasably holding the knife blades in position for tenderizing the meat passing through the machine. The same amount of holding force may be exerted as before, and when one or more blades contacts a piece of bone on the downward travel of the head, the frictional portion of the blade is caused to move upwardly in the aperture 28, until the frictional portion leaves the aperture, and the blade head with the other blades then continues to travel downwardly, cutting into the meat, while the striking blade is freed of the frictional holding force. When the head returns to the uppermost position, it moves toward a stationary abutment which contacts the heads of the blades, causing the loosened blade(s) to again enter the associated aperture in the friction plate where it is again retained in position, ready for the next cycle.

Figure 8:
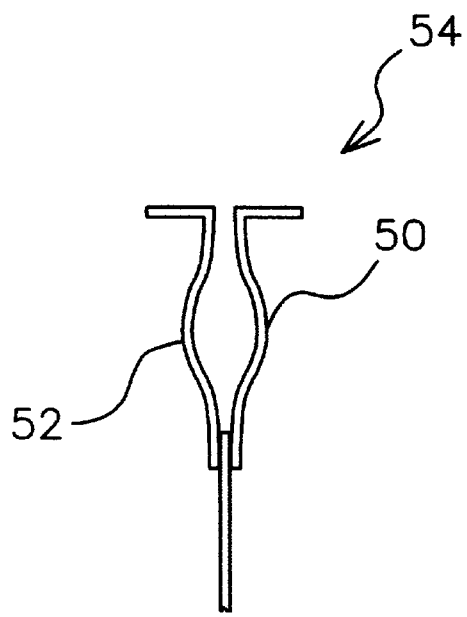
FIGS. 8, 9 and 10 are enlarged fragmentary views of alternate frictional portions of a tenderizing blade.
Figure 9:
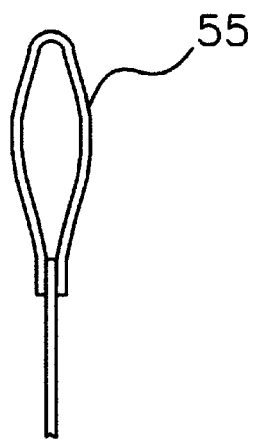
Figure 10:
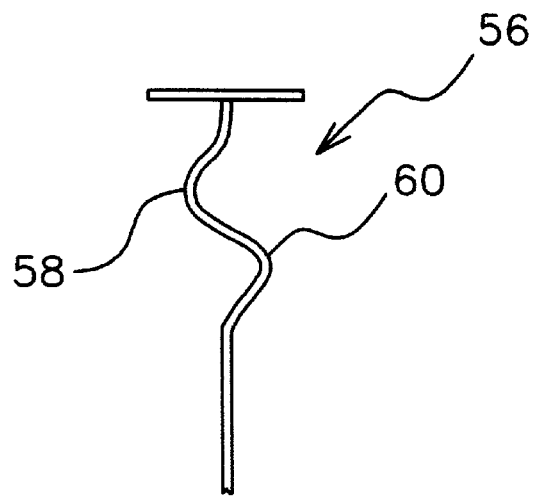

As shown in FIGS. 8, 9 and 10, the friction member of each blade may take different shapes, the important feature being that the shape be such as to create a nonmagnetic releasable force with the friction plate. Thus, in FIG. 8, the friction member comprises a pair of furcations 50, 52 which have L-shaped bends at their distal ends integrally forming a head 54. As shown in FIG. 9, the friction member is formed as a loop 55 on the end of the blade. And, as seen in FIG. 10, the friction member may be in the shape of a shape formed directly in the blade, for example as an S-shape or a sine-wave shape 56, whereby two surfaces 58, 60 are provided for resiliently contacting the apertures walls in the friction plate and providing the releasable holding force.

Experimentation has shown that blades constructed in accordance with the present invention can undergo over a million cycles without significant wear of the friction surfaces, and thus without any significant loss in the holding force necessary for retaining the blades in position as they cut into the meat being tenderized.

While this invention has been described as having certain preferred features and embodiments, it will be understood that it is capable of still further variation and modification without departing from the spirit of the invention, and this application is intended to cover any and all variations, modifications and adaptations as may fall within the spirit of the invention and the scope of the appended claims.

I claim:

1. An apparatus for tenderizing meat comprising means for supporting the meat to be tenderized,
    a plurality of elongated cutting blades having cutting edges formed on one end thereof,
    a reciprocable head having means for mounting said blades in spaced relationship with their longitudinal axes substantially parallel for force-limited insertion into the meat,
    said cutting blades having a friction member formed therein, spaced from said one end and coacting with said reciprocable head for holding said blades in relation to said reciprocable head and providing a predetermined force for consistently holding each of said blades independently in a fixed position as said blades are inserted into the meat to be tenderized.

2. An apparatus for tenderizing meat as in claim 1 and wherein said reciprocable head comprises a friction plate having apertures formed therein and cooperating with said friction elements.

3. An apparatus for tenderizing meat as in claim 2 and wherein said reciprocable head comprises an alignment plate having alignment apertures formed therein in alignment with the apertures formed in said friction plate for aligning the rotational position of each blade.

4. An apparatus for tenderizing meat as in claim 3 and wherein said reciprocable head comprises a guide plate having apertures formed therein in alignment with the apertures of said alignment plate and said friction plate for positioning.

5. An apparatus for tenderizing meat as in claim 2 and wherein said apertures in said friction plate are rectangular.

6. An apparatus for tenderizing meat as in claim 5 and including chamfers formed around each of said apertures in said friction plate.

7. An apparatus for tenderizing meat as in claim 2 and wherein said friction member comprises a pair of furcations formed in said blade near the other end of said blade.

8. An apparatus for tenderizing meat as in claim 7 and wherein said furcations are spaced apart and are curved with a large radius of curvature and have a smooth transition to the blade.

9. An apparatus for tenderizing meat as in claim 8 and wherein said blades have an enlarged head at said other end.

10. An apparatus for tenderizing meat as in claim 8 and wherein said furcations have a spring-like resiliency urging said furcations against said friction plate in the apertures in said friction plate.

11. An apparatus for tenderizing meat as in claim 8 and wherein said furcations form a loop at the end of said blade.

12. An apparatus for tenderizing meat as in claim 2 and wherein said friction member comprises a curved shape formed in said blade.

13. An apparatus for tenderizing meat as in claim 2 and wherein said apertures in said friction plate are rectangular.

14. An apparatus for tenderizing meat as in claim 3 and wherein said apertures formed in said alignment plate are cruciform in shape.

15. An apparatus for tenderizing meat as in claim 14 and wherein said apertures in said friction plate are rectangular.

16. An apparatus for tenderizing meat comprising a reciprocable head for releasably holding knife blades for force-limited insertion into meat to be tenderized, said reciprocable head comprising a guide plate, a friction plate and an orientation plate, said guide plates having a plurality of guide apertures formed therein, said friction plate having a plurality of friction apertures formed therein, and said orientation plate having a plurality of orienting apertures formed therein, and said plates being assembled in spaced, parallel relationship with said apertures being in alignment,
    a plurality of elongated knife blades having cutting edges formed on one end thereof and positioned in said aligned apertures such that each blade passes through an aperture in each of said plates,
    said cutting blades each having a friction member formed therein and releasably retained in an aperture in said friction plate by a pre-determined frictional force for consistently holding said blades independently in a fixed position as said blades are inserted into the meat to be tenderized.

* * * * *